US012530156B2

(12) United States Patent
Mishima et al.

(10) Patent No.: US 12,530,156 B2
(45) Date of Patent: Jan. 20, 2026

(54) INFORMATION PROCESSING APPARATUS, SYSTEM, NON-TRANSITORY COMPUTER READABLE MEDIUM, AND METHOD FOR MANAGING RECEPTION INFORMATION WITH VALIDITY PERIOD

(71) Applicant: FUJIFILM BUSINESS INNOVATION CORP., Tokyo (JP)

(72) Inventors: Tatsuo Mishima, Kanagawa (JP); Kohei Hashimoto, Kanagawa (JP); Tomohiro Masubuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 567 days.

(21) Appl. No.: 17/859,094

(22) Filed: Jul. 7, 2022

(65) Prior Publication Data

US 2023/0297301 A1 Sep. 21, 2023

(30) Foreign Application Priority Data

Mar. 18, 2022 (JP) ................................. 2022-043983

(51) Int. Cl.
*G06F 3/12* (2006.01)
(52) U.S. Cl.
CPC .......... *G06F 3/1238* (2013.01); *G06F 3/1204* (2013.01); *G06F 3/1222* (2013.01)
(58) Field of Classification Search
None
See application file for complete search history.

(56) References Cited

U.S. PATENT DOCUMENTS

| 8,780,377 B2 | 7/2014 | Nishida et al. |
| 10,740,055 B2 | 8/2020 | Tokumoto |
| 2007/0136087 A1* | 6/2007 | Yamaguchi ........ G06Q 10/0637 |
| | | 358/1.15 |
| 2013/0141760 A1* | 6/2013 | Mori ..................... G06F 3/1261 |
| | | 358/1.15 |
| 2016/0188260 A1* | 6/2016 | Saino ..................... G06F 3/126 |
| | | 358/1.15 |

FOREIGN PATENT DOCUMENTS

| JP | 2013-010190 A | 1/2013 |
| JP | 2013-033437 A | 2/2013 |
| JP | 2015-091053 A | 5/2015 |
| JP | 2019-016103 A | 1/2019 |
| JP | 2020-009062 A | 1/2020 |
| WO | WO-2019221695 A1 * | 11/2019 ........... G06F 21/608 |

OTHER PUBLICATIONS

Nov. 25, 2025 Office Action issued in Japanese Patent Application No. 2022-043983.

* cited by examiner

*Primary Examiner* — Thomas D Lee
(74) *Attorney, Agent, or Firm* — Oliff PLC

(57) ABSTRACT

An information processing apparatus includes a memory and a processor configured to: receive reception information from a user and authentication information including a validity period which is determined on a per user basis and throughout which a transmission destination apparatus transmitting the reception information is available; store the reception information on the memory; and delete the reception information from the memory when the validity period expires.

14 Claims, 12 Drawing Sheets

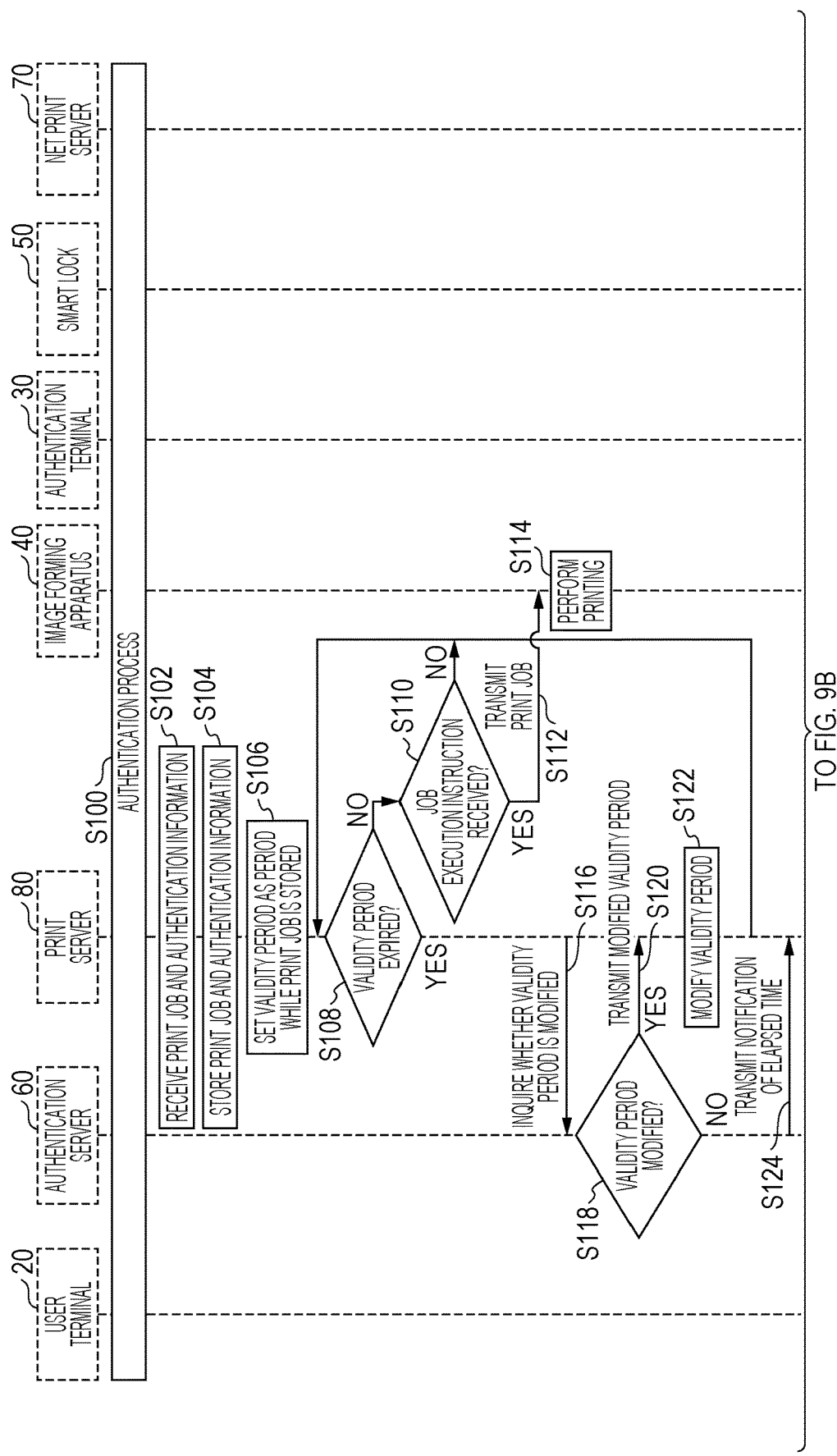

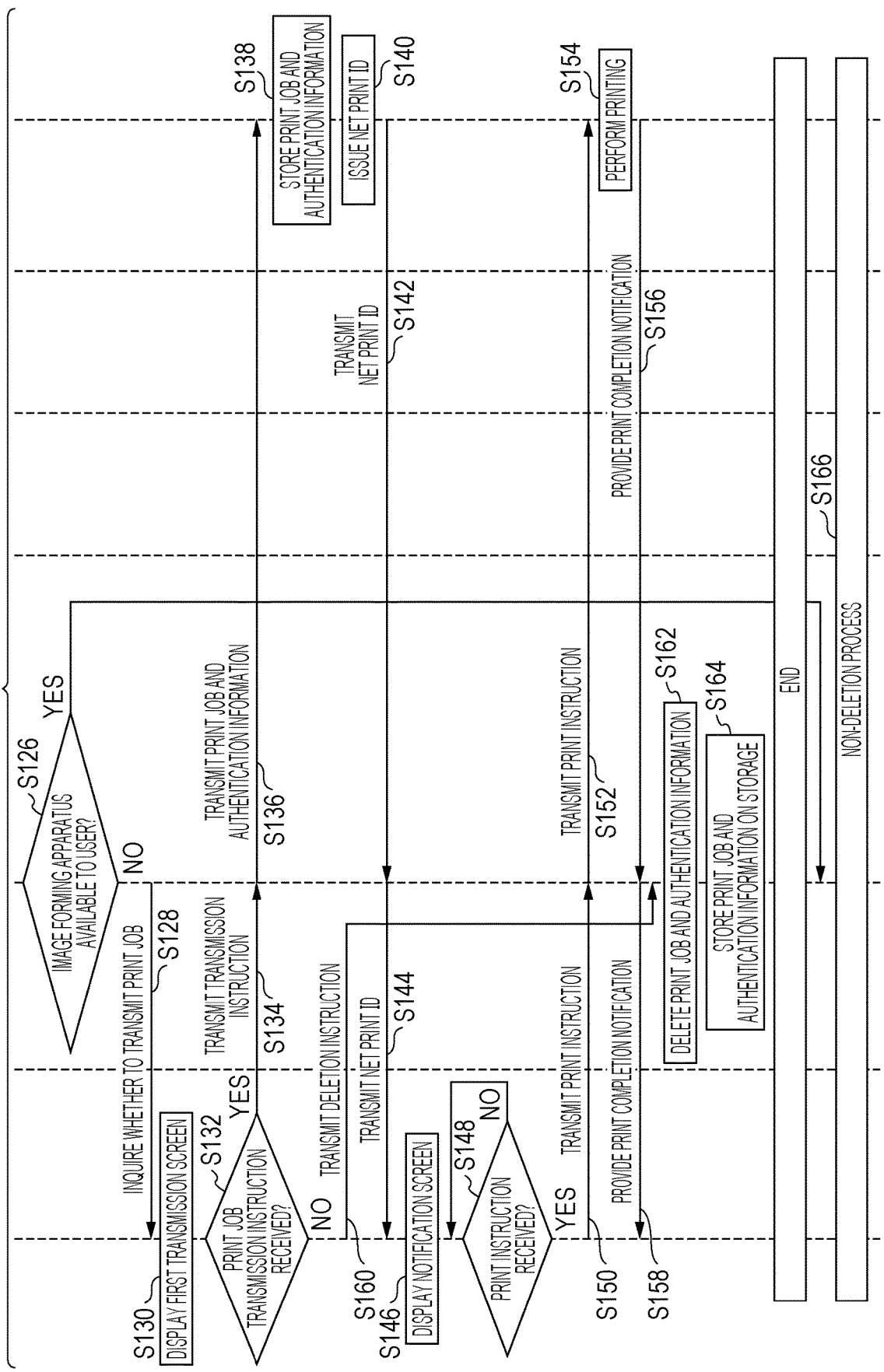

FIG. 10
PRINT JOB STORING TIME PERIOD
HAS EXPIRED.
SELECT "TRANSMIT" BUTTON
TO TRANSMIT PRINT JOB
TO NET PRINT SERVER,
OR SELECT "DELETE" BUTTON
NOT TO TRANSMIT PRINT JOB
BUT TO DELETE PRINT JOB.
TRANSMIT
DELETE

FIG. 11

NET PRINT ID USED TO EXECUTE PRINT JOB ON
NET PRINT SERVER IS AS FOLLOWS:

NET PRINT ID
12345

FIG. 13

ENTER IDENTIFICATION INFORMATION.

PRINT JOB STORING TIME PERIOD HAS EXPIRED.

SELECT "TRANSMIT" BUTTON TO TRANSMIT PRINT JOB TO NET PRINT SERVER, OR SELECT "NOT-TRANSMIT" BUTTON NOT TO TRANSMIT PRINT JOB.

TRANSMIT

NOT-TRANSMIT

INFORMATION PROCESSING APPARATUS, SYSTEM, NON-TRANSITORY COMPUTER READABLE MEDIUM, AND METHOD FOR MANAGING RECEPTION INFORMATION WITH VALIDITY PERIOD

CROSS-REFERENCE TO RELATED APPLICATIONS

This application is based on and claims priority under 35 USC 119 from Japanese Patent Application No. 2022-043983 filed Mar. 18, 2022.

BACKGROUND

(i) Technical Field

The present disclosure relates to an information processing apparatus, an information processing system, a non-transitory computer readable medium, and an information processing method.

(ii) Related Art

Japanese Unexamined Patent Application Publication No. 2013-033437 discloses a print control apparatus that manages a print job and a printer in response to an instruction from a client terminal. The print control apparatus includes a reception unit that receives from the client terminal a print instruction for the printer and authentication information on the client terminal and a verification unit that verifies the validity of the authentication information with an authenticating unit that issues and manages the authentication information. The print control apparatus further includes an execution job management unit that registers a print job, as a job to be executed, together with the authentication information if the authentication information is valid, and an update unit that updates the validity period of the registered authentication information by accessing the authenticating unit while the job to be executed is registered.

Japanese Unexamined Patent Application Publication No. 2020-009062 discloses a print system that includes multiple printers and is capable of printing, on one printer, print data that is stored on another printer. Each printer in the print system includes a receiving unit that receives the print data transmitted from an information processing apparatus and a memory that stores the received print data. Each printer further includes a registration unit that registers bibliographic information on a bibliographic server. The bibliographic information is on the print data stored on the memory and includes at least identification information identifying the printer having stored the print data and date and time of the reception of the print data. Each printer further includes a transmitting unit that transmits the print data stored on the memory in response to a request from another printer that has acquired the bibliographic information managed by the bibliographic server. Each printer further includes an acquisition unit that acquires the bibliographic information managed by the bibliographic server. Each printer further includes an operation unit that displays a list of the print data in accordance with the acquired bibliographic information while receiving an indication indicative of the print data selected by a user from the displayed list. Each printer further includes a print unit that, if the print data is stored on the memory of the printer, performs printing in accordance with the print data stored on the memory and in accordance with the identification information included in the bibliographic information on the print data selected as a print target by the operation unit. If the print data is stored on another printer, the print unit requests the other printer to transmit the print data and then performs printing in accordance with the print data transmitted from the other printer in response to the request. Each printer further includes a setting unit that sets the validity period of the print data. Each printer further includes a deletion unit that deletes the print data stored on the memory of the printer, based on the identification information included in the acquired bibliographic information and in accordance with the date and time of the reception included in the bibliographic information on the print data and the validity period set by the setting unit. The deletion unit performs control such that the print data stored on the other printer is not deleted in accordance with the date and time of the reception included in the bibliographic information on the print data and the validity period set by the setting unit.

Japanese Unexamined Patent Application Publication No. 2015-091053 discloses an image processing service providing apparatus. The image processing service providing apparatus includes a memory unit that temporarily stores, on a memory, image data and control information on the image data together with a validity period, and a transmitting unit that transmits the image data and control data to an external service when the validity period of the temporarily stored image data and control information expires. The image processing service providing apparatus includes an acquisition unit that acquires the image data and control information from the external service when a process request for the image data is received. The image processing service providing apparatus further includes an image processing unit that processes the image data, acquired by the acquisition unit, in accordance with the process request and the control information acquired by the control information, and a transfer unit that transfers the image data processed by the image processing unit to the external service.

An information processing apparatus of related art stores, on a memory thereof, reception information received from a user, transmits the reception information to a transmission destination apparatus, and deletes the reception information from the memory after transmitting the reception information. The validity period throughout the transmission destination apparatus is available is predetermined on a per user basis. If the reception information is not transmitted to the transmission destination apparatus within the validity period, the reception information remains stored even after the validity period expires.

SUMMARY

Aspects of non-limiting embodiments of the present disclosure relate to providing an information processing apparatus, information processing system, non-transitory computer readable medium, and information processing method wherein the reception information is not left stored after the expiration of the validity period.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory and a processor configured to: receive reception information from a user and authentication information including a validity period which is determined on a per user basis and throughout which a transmission destination apparatus transmitting the reception information is available; store the reception information on the memory; and delete the reception information from the memory when the validity period expires.

BRIEF DESCRIPTION OF THE DRAWINGS

Exemplary embodiment of the present disclosure will be described in detail based on the following figures, wherein:

FIGS. 9A and 9B are a sequence chart illustrating a flow of an authentication process of the information processing system of the exemplary embodiment;

FIG. 10 schematically illustrates an example of a first transmission screen of the exemplary embodiment;

FIG. 11 schematically illustrates an example of a notification screen of the exemplary embodiment;

FIG. 13 schematically illustrates an example of an input screen of the exemplary embodiment;

FIG. 15 schematically illustrates an example of a second transmission screen of the exemplary embodiment.

DETAILED DESCRIPTION

Figure 1:
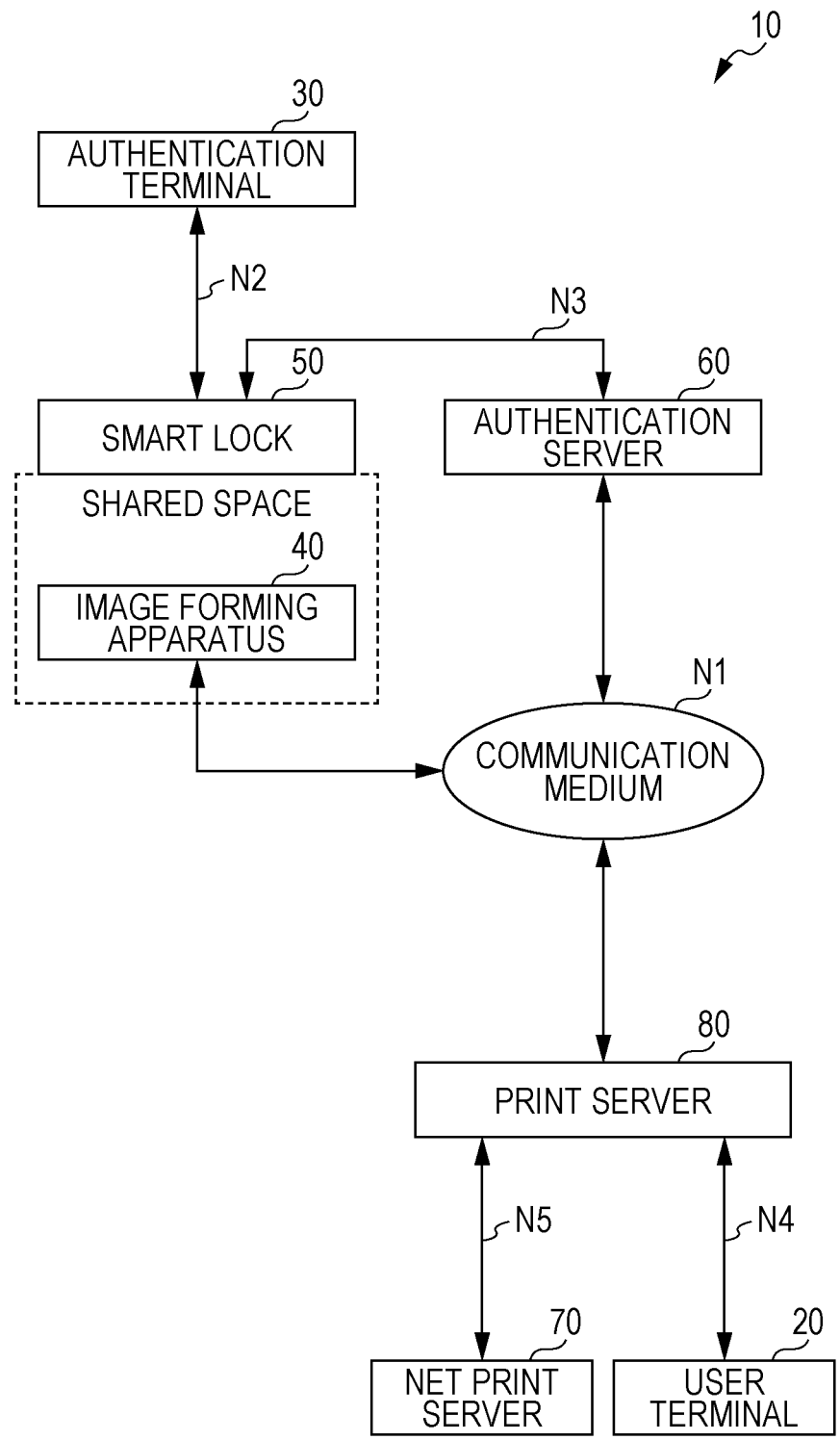
FIG. 1 schematically illustrates an example of a hardware configuration of an information processing system of an exemplary embodiment.

Exemplary embodiment of the disclosure is described with reference to the drawings. In the drawings, like elements are designated with like reference numerals. Elements in the drawings are not necessarily drawn to scale and dimensions of some elements may be exaggerated to other elements for convenience of explanation.

Referring to FIG. 1, an information processing system 10 of the exemplary embodiment includes a user terminal 20, authentication terminal 30, image forming apparatus 40, smart lock 50, authentication server 60, net print server 70, and print server 80.

The image forming apparatus 40, authentication server 60, and print server 80 are communicably connected to each other via a communication network N1. According to the exemplary embodiment, the communication network N1 includes but is not limited to the Internet or a public communication line, such as a telephone network. The communication network N1 may include an in-house communication network, such as a local area network (LAN) or a wide area network (WAN). The communication network N1 may include a combination of an in-house communication network and a public communication network. According to the exemplary embodiment, the communication network N1 is a radio communication network. Alternatively, the communication network N1 may include a wired communication network or a combination of the wireless communication network and the wired communication network.

In the exemplary embodiment, the smart lock 50 and the authentication terminal 30 are communicably interconnected to each other via a communication network N2 and the smart lock 50 and authentication server 60 are communicably interconnected to each other via a communication network N3. Alternatively, the smart lock 50 and authentication server 60 may be communicably interconnected to each other via the communication network N1. In the exemplary embodiment, the user terminal 20 and print server 80 are communicably interconnected to each other via a communication network N4 and the net print server 70 and print server 80 are communicably interconnected to each other via a communication network N5. Alternatively, the user terminal 20 and print server 80 may be communicably interconnected to each other via the communication network N4 or the communication network N1 and the net print server 70 and print server 80 may be communicably interconnected to each other via the communication network N4 or the communication network N1.

The user terminal 20 is an information processing terminal held by a user. In the exemplary embodiment, the user terminal 20 includes but is not limited to a personal computer. The user terminal 20 may be any apparatus as long as the apparatus is capable of transmitting a print job as reception information to be discussed below to the print server 80.

Figure 2:
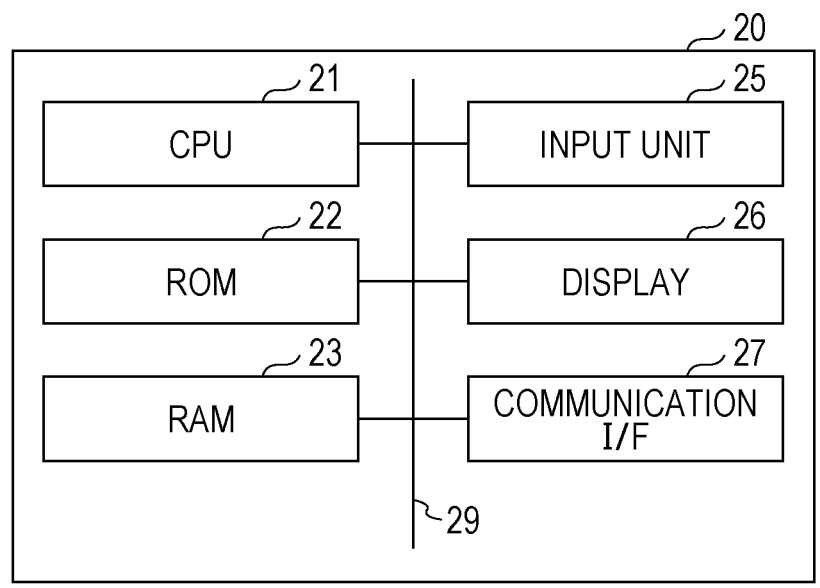
FIG. 2 is a block diagram illustrating an example of a hardware configuration of a user terminal of the exemplary embodiment.

Referring to FIG. 2, the user terminal 20 includes a central processing unit (CPU) 21, read-only memory (ROM) 22, random-access memory (RAM) 23, input unit 25, display 26, and communication interface (I/F) 27. These elements are communicably interconnected to each other via a bus 29.

The CPU 21 is executes a variety of programs and controls elements. The CPU 21 reads a program from the ROM 22 and executes the program using the RAM 23 as a working area. In accordance with a program stored on the ROM 22, the CPU 21 controls the elements and performs a variety of arithmetic operations. In the exemplary embodiment, the ROM 22 stores a terminal program 22A.

The ROM 22 stores a variety of programs and a variety of data. The RAM 23 serving as the working area temporarily stores programs and data.

The input unit 25 includes a pointing device, such as a mouse and a keyboard, and is used to enter inputs.

The display 26 is, for example, a liquid-crystal display and displays a variety of information. The display 26 may be of a touch-panel type so as to function as the input unit 25.

The communication I/F 27 serves as an interface to connect with another device, such as the print server 80, and complies with standards, such as Ethernet (registered trademark), fiber-distributed data interface (FDDI), or Wi-Fi (registered trademark).

The authentication terminal 30 transmits identification information identifying a user to the smart lock 50 to be discussed below. In the exemplary embodiment, the authentication terminal 30 includes but is not limited to a smart phone. The authentication terminal 30 may include an integrated circuit (IC) card.

Figure 3:
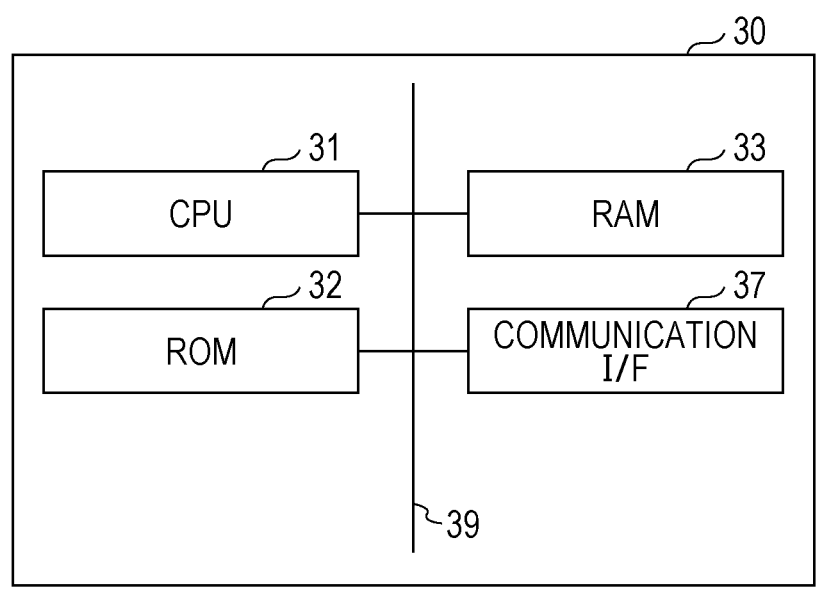
FIG. 3 is a block diagram illustrating an example of a hardware configuration of an authentication terminal of the exemplary embodiment.

Referring to FIG. 3, the authentication terminal 30 includes a CPU 31, ROM 32, RAM 33, and communication I/F 37. These elements are communicably interconnected to each other via a bus 39. The functions of the CPU 31, ROM 32, RAM 33, and communication I/F 37 are respectively identical to the functions of the CPU 21, ROM 22, RAM 23, and communication I/F 27 in the user terminal 20.

The ROM 32 stores a transmission program 32A. The CPU 31 reads the transmission program 32A from the ROM 32 and executes the transmission program 32A using the RAM 33 as a working area.

The communication I/F 37 communicates with another device, such the smart lock 50, and performs near-field communication, such as of Bluetooth (registered trademark) or Wi-Fi (registered trademark).

Referring to FIG. 1, the image forming apparatus 40 serving as a transmission destination apparatus is installed in space that may be shared by multiple users. The image forming apparatus 40 receives from the print server 80 a print job as reception information to be discussed below and performs the print job.

Figure 4:
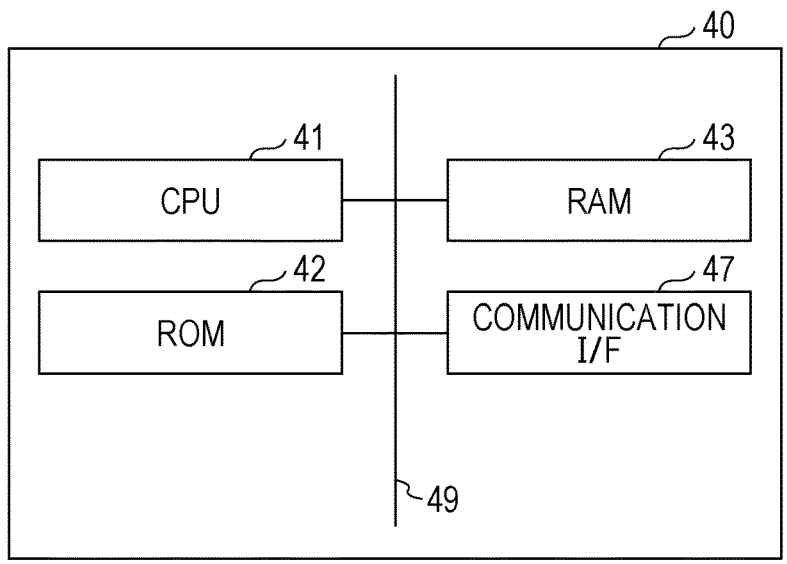
FIG. 4 is a block diagram illustrating an example of a hardware configuration of an image forming apparatus of the exemplary embodiment.

Referring to FIG. 4, the image forming apparatus 40 includes a CPU 41, ROM 42, RAM 43, and communication I/F 47. These elements are communicably interconnected to each other via a bus 49. The functions of the CPU 41, ROM 42, RAM 43, and communication I/F 47 are respectively identical to the functions of the CPU 21, ROM 22, RAM 23, and communication I/F 27 in the user terminal 20.

The ROM 42 stores an execution program 42A. The CPU 41 reads the execution program 42A from the ROM 42 and executes the execution program 42A using the RAM 43 as a working area.

The smart lock 50 locks or unlocks an exit and entrance of the shared space and is an electronic lock having a communication function.

Figure 5:
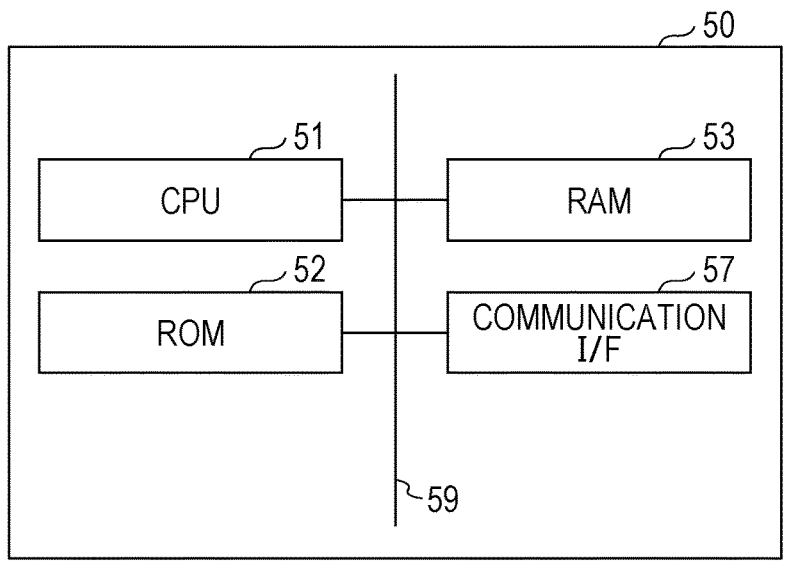
FIG. 5 is a block diagram illustrating an example of a hardware configuration of a smart lock of the exemplary embodiment.

Referring to FIG. 5, the smart lock 50 includes a CPU 51, ROM 52, RAM 53, and communication I/F 57. These elements are communicably interconnected to each other via a bus 59. The functions of the CPU 51, ROM 52, RAM 53, and communication I/F 57 are respectively identical to the functions of the CPU 21, ROM 22, RAM 23, and communication I/F 27 in the user terminal 20.

The ROM 52 stores a management program 52A. The CPU 51 reads the management program 52A from the ROM 52 and executes the management program 52A using the RAM 53 as a working area.

The authentication server 60 is used to authenticate a user.

Figure 6:
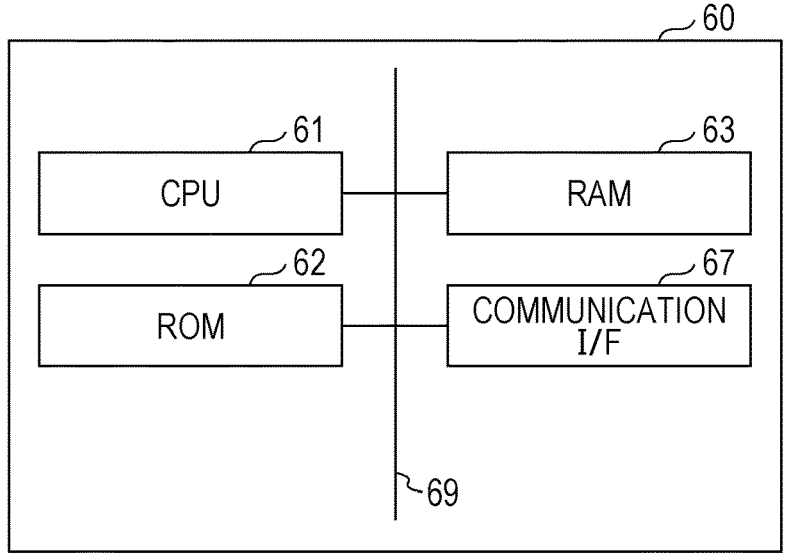
FIG. 6 is a block diagram illustrating an example of a hardware configuration of an authentication server of the exemplary embodiment.

Referring to FIG. 6, the authentication server 60 includes a CPU 61, ROM 62, RAM 63, and communication I/F 67. These elements are communicably interconnected to each other via a bus 69. The functions of the CPU 61, ROM 62, RAM 63, and communication I/F 67 are respectively identical to the functions of the CPU 21, ROM 22, RAM 23, and communication I/F 27 in the user terminal 20.

The ROM 62 stores an authentication program 62A. The CPU 61 reads the authentication program 62A from the ROM 62 and executes the authentication program 62A using the RAM 63 as a working area.

The ROM 62 stores a user database 62B. The ROM 62 stores, in an associated form, identification information and information on a validity period. The identification information identifies a user who is permitted to enter the shared space and the validity period is a time period throughout which the image forming apparatus 40 installed in the shared space is available. The identification information and validity period are determined on each individual user. In the exemplary embodiment, a time period throughout which the image forming apparatus 40 is available is a time period throughout which an entry of a user into the shared space is authenticated. Specifically, the user database 62B stores, in an associated form, the identification information on the user who is permitted to enter the shared room and the time period throughout which the entry of the user into the shared space is authenticated. The identification information and validity period are collectively referred to as authentication information.

The net print server 70, different from the image forming apparatus 40, is an apparatus other than the print server 80. The net print server 70 receives the reception information from the print server 80.

Figure 7:
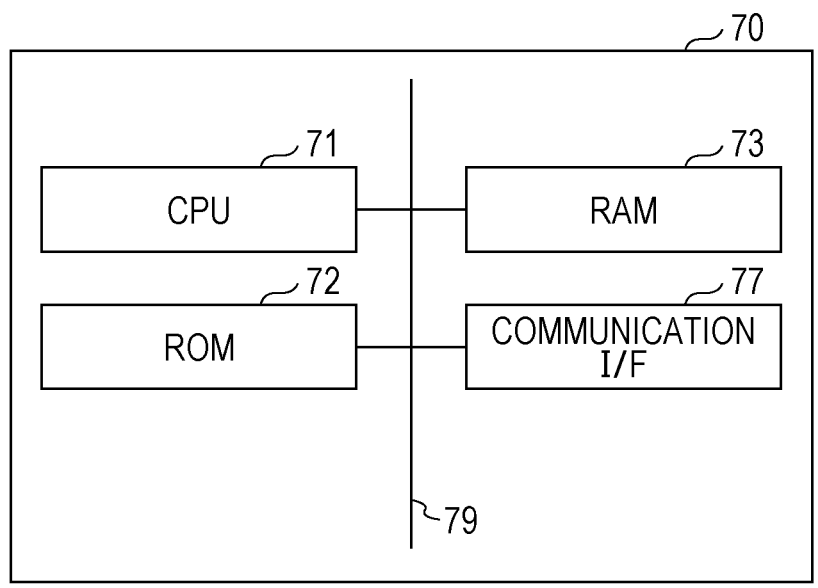
FIG. 7 is a block diagram illustrating an example of a hardware configuration of a net print server of the exemplary embodiment.

Referring to FIG. 7, the net print server 70 includes a CPU 71, ROM 72, RAM 73, and communication I/F 77. These elements are communicably interconnected to each other via a bus 79. The functions of the CPU 71, ROM 72, RAM 73, and communication I/F 77 are respectively identical to the functions of the CPU 21, ROM 22, RAM 23, and communication I/F 27 in the user terminal 20.

The ROM 72 stores a net print program 72A. The CPU 71 reads the net print program 72A from the ROM 72 and executes the net print program 72A using the RAM 73 as a working area.

The RAM 73 stores, in an associated form, a print job and the authentication information received from the print server 80.

The print server 80 serving as the information processing apparatus stores the print job as the reception information received from the user terminal 20 and transmits the print job to the image forming apparatus 40. The print server 80 deletes the print job after transmitting the print job.

Figure 8:
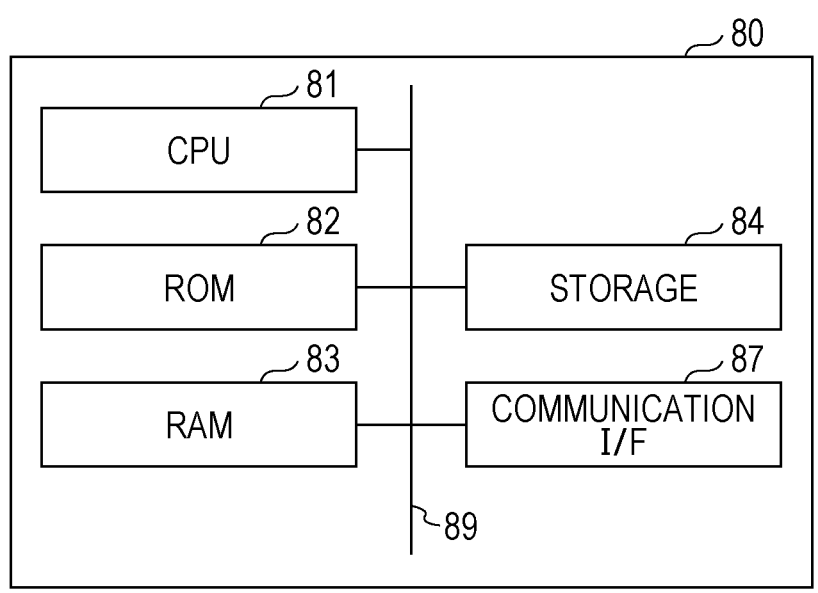
FIG. 8 is a block diagram illustrating an example of a hardware configuration of a print server of the exemplary embodiment.

Referring to FIG. 8, the print server 80 includes a CPU 81, ROM 82, RAM 83, storage 84, and communication I/F 87. These elements are communicably interconnected to each other via a bus 89. The functions of the CPU 81, ROM 82, RAM 83, and communication I/F 87 are respectively identical to the functions of the CPU 21, ROM 22, RAM 23, and communication I/F 27 in the user terminal 20.

The ROM 82 stores an information processing program 82A. The CPU 81 reads the information processing program 82A from the ROM 82, and executes the information processing program 82A using the RAM 83 as a working area.

The RAM 83 serving as a memory stores, in an associated form, the print job as the reception information received from the user terminal 20 and the authentication information.

A storage 84 serving as a memory different from the RAM 83 has a higher security level than the RAM 83. The storage 84 stores, in an associated form, the print job deleted from the RAM 83 and the authentication information.

The flow of an information processing process of the information processing system 10 of the exemplary embodiment is described with reference to FIGS. 9 through 15.

A process of the user terminal 20 is performed when the CPU 21 executes the terminal program 22A by reading the terminal program 22A from the ROM 22 and loading the terminal program 22A onto the RAM 23. A process of the authentication terminal 30 is performed when the CPU 31 executes the transmission program 32A by reading the transmission program 32A from the ROM 32 and loading the transmission program 32A onto the RAM 33. A process of the image forming apparatus 40 is performed when the CPU 41 executes the execution program 42A by reading the execution program 42A from the ROM 42 and loading the execution program 42A onto the RAM 43. A process of the smart lock 50 is performed when the CPU 51 executes the management program 52A by reading the management program 52A from the ROM 52 and loading the management program 52A onto the RAM 53. A process of the authentication server 60 is performed when the CPU 61 executes the authentication program 62A by reading the authentication program 62A from the ROM 62 and loading the authentication program 62A onto the RAM 63. A process of the net print server 70 is performed when the CPU 71 executes the net print program 72A by reading the net print program 72A from the ROM 72 and loading the net print program 72A onto the RAM 73. A process of the print server 80 is performed when the CPU 81 executes the information processing program 82A by reading the information processing program 82A from the ROM 82 and loading the information processing program 82A onto the RAM 83.

In step S100 in FIG. 9A, the user terminal 20, authentication terminal 30, image forming apparatus 40, smart lock 50, authentication server 60, net print server 70, and print server 80 perform an authentication process that authenticates a user. The details of the authentication process are described below with reference to FIG. 12.

In step S102, the CPU 81 in the print server 80 receives a print job as the reception information and authentication information. The print job received by the CPU 81 in step S102 may be simply referred to as a "print job" and the authentication information received by the CPU 81 in step S102 may be simply referred to as "authentication information".

In step S104, the CPU 81 stores the received print job and authentication information on the RAM 83. Specifically, the CPU 81 stores, in an associated form, the print job and authentication information on the RAM 83.

In step S106, the CPU 81 stores the validity period included in the authentication information as a time period throughout which the print job remains stored on the RAM 83.

In step S108, the CPU 81 determines whether the validity period has expired. If the validity period has expired (yes path in step S108), the CPU 81 proceeds to step S116. If the validity period has not expired (no path in step S108), the CPU 81 proceeds to step S110.

In step S110, the CPU 81 determines whether a job execution instruction to execute the print job has been received from the user terminal 20. If the job execution instruction has been received from the user terminal 20 (yes path in step S110), the CPU 81 proceeds to step S112. On the other hand, if the job execution instruction has not been received from the user terminal 20 (no path in step S110), the CPU 81 returns to step S108.

In step S112, the CPU 81 transmits the print job to the image forming apparatus 40 and deletes from the RAM 83 the print job and authentication information associated with the print job.

In step S114, the CPU 41 in the image forming apparatus 40 performs the print job received from the print server 80. The process of the information processing system 10 thus ends.

In step S116, the CPU 81 inquires the authentication server 60 whether the validity period is modified after the entry of the user into the shared space.

In step S118, the CPU 61 in the authentication server 60 determines whether the validity period is modified after the entry of the user into the shared space. Specifically, the CPU 61 in the authentication server 60 reads the user database 62B and determines whether the validity period stored on the user database 62B is modified after the reception of the identification information from the smart lock 50. If the validity period is modified after the entry of the user into the shared space (yes path in step S118), the CPU 61 proceeds to step S120. If the validity period is not modified after the entry of the user into the shared space (no path in step S118), the CPU 61 proceeds to step S124.

In step S120, the CPU 61 transmits to the print server 80 the validity period that is modified after the entry of the user into the shared space. In other words, the CPU 61 transmits to the print server 80 the validity period that is modified after the reception of the identification information from the smart lock 50.

In step S122, the CPU 81 in the print server 80 modifies the time period of storing the print job to the validity period received in step S120 and then returns to step S108.

In step S124, the CPU 61 in the authentication server 60 transmits to the print server 80 an expiration notification indicating that the validity period has expired. In other words, the CPU 61 provides to the print server 80 a notification that the validity period is not modified after the entry of the user into the shared space.

In step S126, the CPU 81 in the print server 80 determines whether the image forming apparatus 40 is available to the user. In other words, the CPU 81 determines whether a validity period continues to be present after the expired validity period. If the image forming apparatus 40 is not available to the user (no path in step S126), the CPU 81 proceeds to step S128.

In step S128, the CPU 81 inquires the user terminal 20 whether to transmit the print job to the net print server 70.

In step S130, the CPU 21 in the user terminal 20 displays on the display 26 a first transmission screen complying with a predetermined format.

Referring to FIG. 10, the first transmission screen of the exemplary embodiment displays a message telling that the time period of storing the print job has expired. The first transmission screen of the exemplary embodiment displays a message prompting the user to select a button 26A labeled "Transmit" to transmit the print job to the net print server 70 or to select a button 26B labeled "Delete" not to transmit the print job to the net print server 70 but delete the print job.

In step S132, the CPU 21 determines whether an instruction to transmit the print job to the net print server 70 has been received. In other words, the CPU 21 determines whether the button 26A labeled "Transmit" has been selected on the first transmission screen. If the instruction to transmit the print job to the net print server 70 has been received (yes path in step S132), the CPU 21 proceeds to step S134.

In step S134, the CPU 21 transmits to the print server 80 an instruction to transmit the print job to the net print server 70.

In step S136, the CPU 81 in the print server 80 transmits to the net print server 70 the print job and the authentication information stored on the RAM 83 in step S104.

In step S138, the CPU 71 in the net print server 70 stores on the RAM 73 the print job and authentication information received from the print server 80.

In step S140, the CPU 71 issues a net print identification (ID) that identifies the received print job and is used to perform the print job.

In step S142, the CPU 71 transmits the issued net print ID to the print server 80.

In step S144, the CPU 81 in the print server 80 transmits to the user terminal 20 the net print ID received from the net print server 70.

In step S146, the CPU 21 in the user terminal 20 displays on the display 26 a notification screen that complies with a predetermined format.

Referring to FIG. 11, the notification screen of the exemplary embodiment displays the net print ID (for example, 12345 as illustrated in FIG. 11) received from the net print server 70.

In step S148, the CPU 21 waits on standby until a print instruction to perform the print job on the net print server 70 is received. Specifically, the CPU 21 waits on standby until the net print ID received from the print server 80 is accepted via the input unit 25 by the user. When the print instruction is received (yes path in step S148), the CPU 21 proceeds to step S150.

In step S150, the CPU 21 transmits to the print server 80 the print instruction received from the user.

In step S152, the CPU 81 in the print server 80 transmits to the net print server 70 the print instruction received from the user terminal 20.

In step S154, the CPU 71 in the net print server 70 performs printing on a print job stored in step S138.

In step S156, the CPU 71 transmit to the print server 80 a print completion notification indicating the printing of the print job has been completed.

In step S158, the CPU 81 in the print server 80 transmits the print completion notification to the user terminal 20. The CPU 81 then proceeds to step S162.

In step S132, if the instruction to transmit the print job to the net print server 70 has not been received (no path in step S132), the CPU 21 proceeds to step S160.

In step S160, the CPU 21 transmits to the print server 80 a deletion instruction indicating that the print job is to be deleted.

In step S162, the CPU 81 in the print server 80 deletes the print job and authentication information stored on the RAM 83 in step S104.

In step S164, the CPU 81 stores onto the storage 84 the print job and authentication information corresponding to the print job and authentication information deleted in step S162. The process of the information processing system 10 thus ends.

If the image forming apparatus 40 is available to the user in step S126 (yes path in step S126), the CPU 81 in the print server 80 proceeds to step S166. In step S166, the user terminal 20, authentication terminal 30, image forming apparatus 40, smart lock 50, authentication server 60, net print server 70, and print server 80 perform a non-deletion process that does not delete the print job. The non-deletion process is described below in detail with reference to FIG. 14.

An authentication process is described below with reference to FIG. 12.

Figure 12:
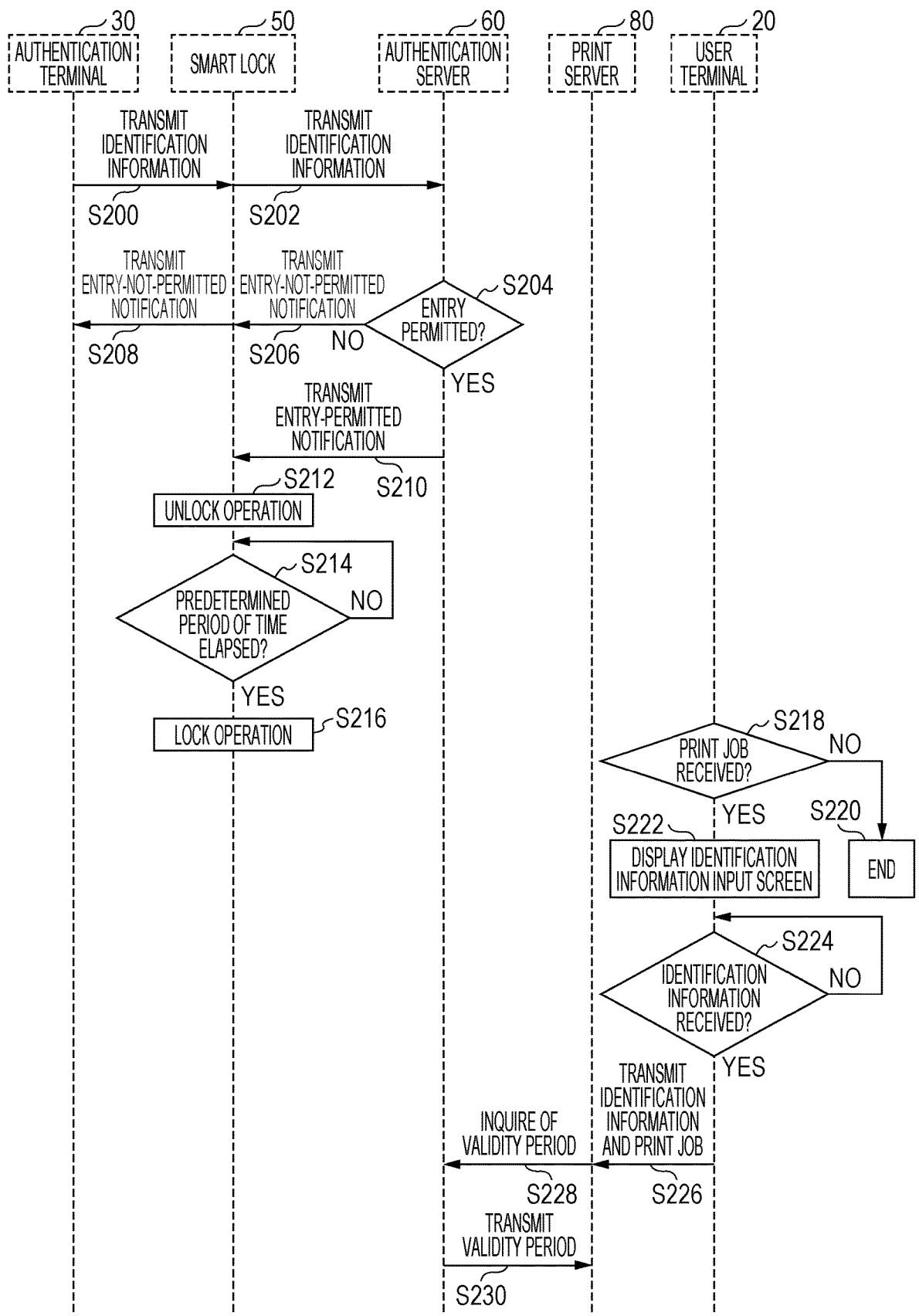
FIG. 12 is a sequence chart illustrating a flow of an authentication process of the information processing system of the exemplary embodiment.

In step S200 in FIG. 12, the CPU 31 in the authentication terminal 30 transmits to the smart lock 50 identification information identifying a user having the authentication terminal 30.

In step S202, the CPU 51 in the smart lock 50 transmits the identification information received from the authentication terminal 30 to the authentication server 60.

In step S204, the CPU 61 in the authentication server 60 determines whether the user having the authentication terminal 30 is permitted to enter the shared space. Specifically, the CPU 61 reads the user database 62B and determines whether the identification information received from the smart lock 50 is stored on the user database 62B and determines whether the date and time of the reception of the identification information are within the validity period. Upon determining that the user having the authentication terminal 30 is permitted to enter the shared space (yes path in step S204), the CPU 61 proceeds to step S210. Upon determining that the user having the authentication terminal 30 is not permitted to enter the shared space (no path in step S204), the CPU 61 proceeds to step S206.

In step S206, the CPU 61 transmits to the smart lock 50 an entry-not-permitted notification that does not permit the user to enter the shared space.

In step S208, the CPU 51 in the smart lock 50 transmits the entry-not-permitted notification to the authentication terminal 30.

In step S210, the CPU 61 transmits to the smart lock 50 an entry-permitted notification that permits the user to enter the shared space.

In step S212, the CPU 51 in the smart lock 50 performs an unlock operation that unlocks the exit and entrance of the shared space.

In step S214, the CPU 51 waits on standby for a predetermined period of time (for example, 1 minute). When the predetermined period of time has elapsed (step S214), the CPU 51 proceeds to step S216.

In step S216, the CPU 51 performs a lock operation that locks the exit and entrance of the shared space.

In step S218, the CPU 21 in the user terminal 20 determines whether the print job has been received from the user via the input unit 25. If the print job has not been received from the user via the input unit 25 (no path in step S218), the CPU 21 proceeds to step S220. On the other hand, if the print job has been received from the user via the input unit 25 (yes path in step S218), the CPU 21 proceeds to step S222.

In step S220, the CPU 21 ends the information processing process.

In step S222, the CPU 21 displays on the display 26 an input screen that complies with a predetermined format.

Figure 13:
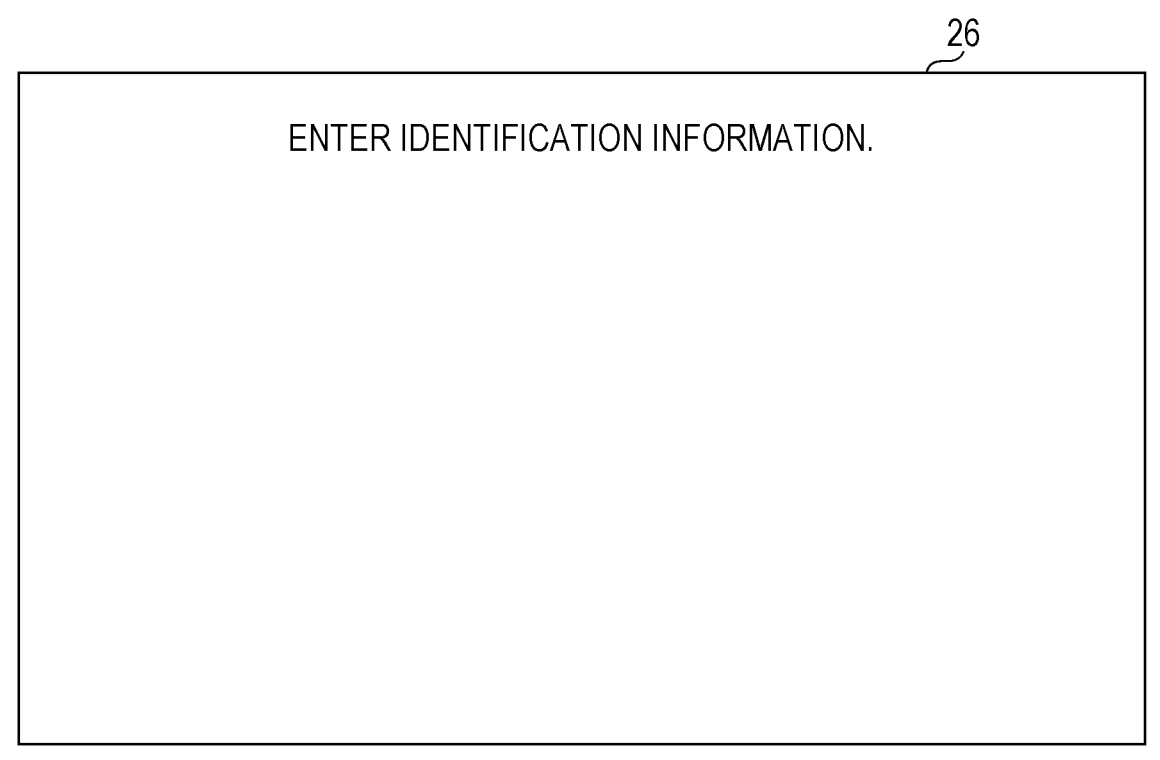

Referring to FIG. 13, the input screen of the exemplary embodiment displays a message prompting the user to enter the identification information.

In step S224, the CPU 21 waits on standby until the identification information has been received via the input unit 25. Upon receiving the identification information, the CPU 21 proceeds to step S226.

In step S226, the CPU 21 transmits to the print server 80 the print job received in step S218 and the identification information received in step S224.

In step S228, the CPU 81 in the print server 80 inquires the authentication server 60 of the validity period associated with the identification information received in step S226.

In step S230, the CPU 61 in the authentication server 60 reads from the user database 62B the validity period associated with the received identification information and then transmits the read validity period to the print server 80.

The non-deletion process is described below responsive to FIG. 14.

Figure 14:
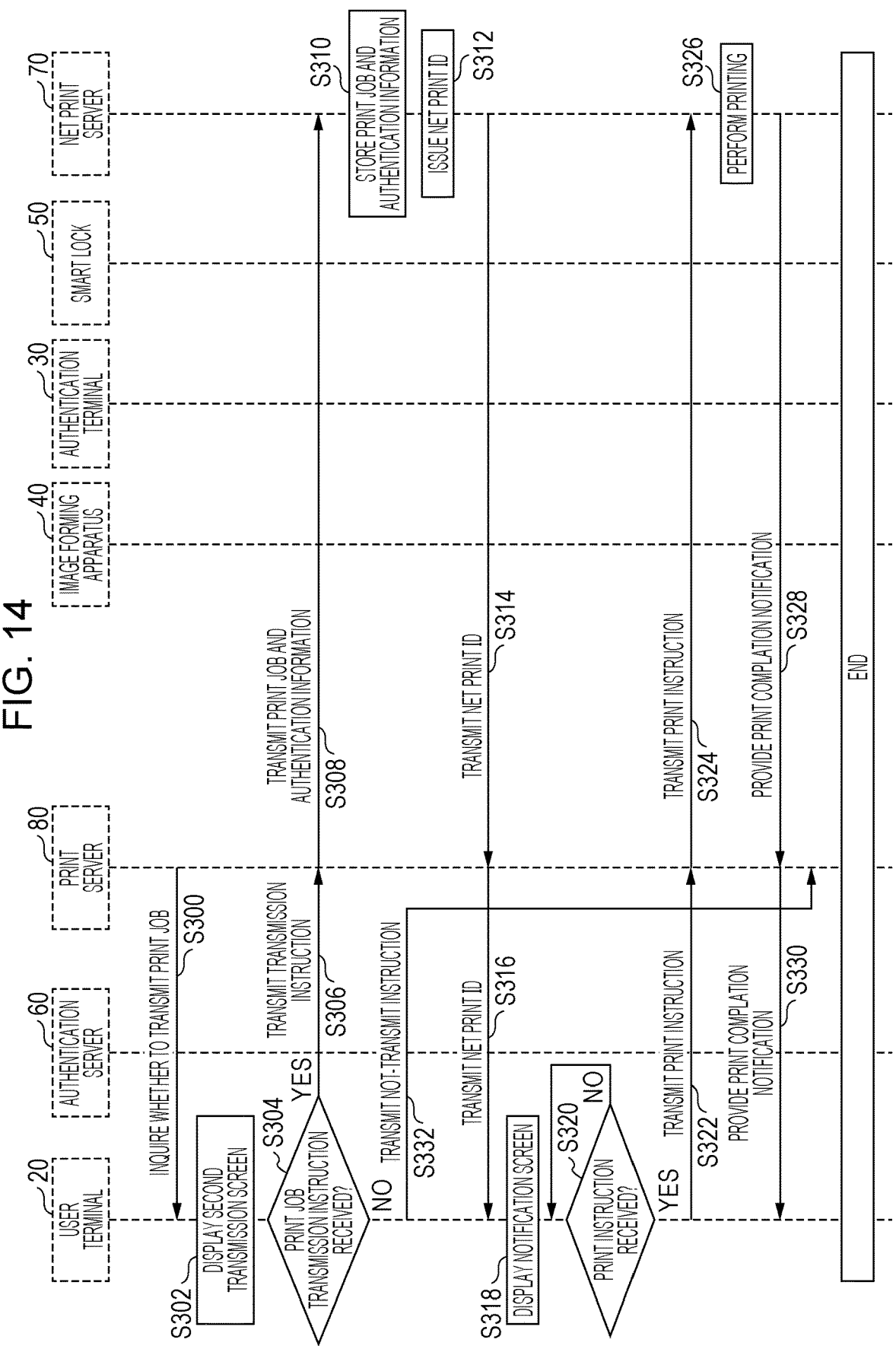
FIG. 14 is a sequence chart illustrating a flow of a non-deletion process of the information processing system the exemplary embodiment.

In step S300 in FIG. 14, the CPU 81 in the print server 80 inquires the user terminal 20 whether to transmit the print job to the net print server 70.

In step S302, the CPU 21 in the user terminal 20 displays on the display 26 a second transmission screen that complies with a predetermined format.

Referring to FIG. 15, the second transmission screen of the exemplary embodiment displays a message telling that the time period of storing the print job has expired. The second transmission screen of the exemplary embodiment displays the message prompting the user to select a button 26A labeled "Transmit" to transmit the print job to the net print server 70 or a button 26C labeled "Not-transmit" not to transmit the print job to the net print server 70.

Since operations in steps S304 through S330 in FIG. 14 are respectively identical to the operations in steps S132 through S158 in FIG. 11, the discussion thereof is omitted herein.

If the CPU 21 in the user terminal 20 has not received an instruction to transmit the print job to the net print server 70 in step S304 (no path in step S304), the CPU 21 proceeds to step S332.

In step S332, the CPU 21 transmits to the print server 80 a not-transmit instruction instructing that the print job is not to be transmitted. The process of the information processing system 10 thus ends.

The exemplary embodiment has been described. The technical scope of the disclosure is not limited to the exemplary embodiment. A variety of changes and modifications are possible without departing from the scope of the disclosure. An exemplary embodiment resulting from the changes or modification may fall within the scope of the disclosure.

The exemplary embodiment is not intended to limit the disclosure defined by the claims and not all the combinations of features described with reference to the exemplary embodiment may be a requirement for a solution to the disclosure. The exemplary embodiment includes a variety of phases of techniques and a variety of techniques may result from combining multiple elements disclosed. If a subpart is deleted from all the elements of the disclosure, the remaining elements without the subpart may form a technique of the disclosure as long as the remaining elements still prove effective.

According to the exemplary embodiment, the reception information is the print job, the transmission destination apparatus is the image forming apparatus, and the information processing apparatus is the print server. The disclosure is not limited to this configuration. For example, the reception information may be the title of a video responsive to a user request to view, the transmission destination apparatus may be a display displaying the video, and the information processing apparatus may be a server. In such a case, the server receives the tile of the video responsive to the user request to view and the authentication information. The authentication information includes information on the validity period which is determined on a per user basis and throughout which the entry of the user into the shared space where the display is installed is authenticated. The server stores the title on a memory and deletes the title from the memory when the validity period has expired.

According to the exemplary embodiment, when the print job is deleted from the RAM 83, the CPU 81 in the print server 80 determines, in response to an instruction from the user terminal 20, whether to transmit the print job to the net print server 70. The disclosure is not limited to this operation. When the print job is deleted from the RAM 83, the CPU 81 may transmit the print job to the net print server 70 at any timing. Alternatively, when the print job is deleted from the RAM 83, the CPU 81 may not necessarily transmit the print job to the net print server 70.

According to the exemplary embodiment, if the image forming apparatus 40 is still available to the user even after the validity period expires, the CPU 81 in the print server 80 performs the non-deletion process such that the print job from the RAM 83 is not deleted. The disclosure is not limited to this operation. If the image forming apparatus 40 is still available to the user even after the validity period expires, the CPU 81 may delete the print job from the RAM 83 when the validity period expires.

According to the exemplary embodiment, if the image forming apparatus 40 is still available to the user after the expiration of the validity period and when an instruction to transmit the print job to the net print server 70 is received from the user terminal 20, the CPU 81 in the print server 80 transmits the print job to the net print server 70. The disclosure is not limited to this operation. If the image forming apparatus 40 is still available to the user after the expiration of the validity period, the CPU 81 may not necessarily transmit the print job to the net print server 70 regardless of the instruction from the user terminal 20.

According to the exemplary embodiment, if the print job is deleted from the RAM 83, the CPU 81 in the print server 80 stores the print job onto the storage 84 that is in the print server 80 and has a higher security level than the RAM 83. The disclosure is not limited to this operation. If the print job is deleted from the RAM 83, the CPU 81 in the print server 80 may store the print job on a memory that is in an apparatus other than the print server 80 and has a higher security level than the RAM 83. The CPU 81 in the print server 80 may store the print job on the storage 84 only if the instruction to transmit the print job to the net print server 70 has not been received.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

According to the exemplary embodiments, the information processing program 82A is stored on the ROM 82. The disclosure is not limited to this operation. The information processing program 82A of the exemplary embodiment may be delivered in a form recorded on a computer readable recording medium. For example, the information processing program 82A of the exemplary embodiment may be delivered in a form recorded on an optical disc, such as a compact disc (CD)-ROM or digital versatile disc (DVD)-ROM, or a semiconductor memory, such as a universal serial bus (USB) or a memory card. The information processing program 82A of the exemplary embodiment may be delivered from an external apparatus via the communication I/F 87.

According to the exemplary embodiments, the process of the information processing system 10 is implemented by a software configuration when programs are executed by a computer. The disclosure is not limited to this operation. For example, the process of the information processing system 10 may be implemented by a hardware configuration, software configuration, or a combination thereof.

The configuration of each of the user terminal 20, authentication terminal 30, image forming apparatus 40, smart lock 50, authentication server 60, net print server 70 and print server 80 has been described for exemplary purposes only. An element of the configuration may be deleted or a new element may be added to the configuration, without departing from the scope of the disclosure.

The flow of the process of the information processing system 10 (see FIGS. 9, 12, and 14) has been described for exemplary purposes only. A step may be deleted from the process or a new step may be added to the process, without departing from the scope of the disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory; and
   a processor configured to:
   receive reception information from a user and authentication information including a validity period which is determined on a per user basis and throughout which a transmission destination apparatus of the reception information is available;
   store the reception information on the memory; and
   delete the reception information from the memory upon determining that (i) the validity period expires and (ii) the transmission destination apparatus is not available to the user after expiry of the validity period,
   wherein the processor is configured to store the reception information on a second memory different from and having a higher security level than the memory if the reception information is deleted from the memory.

2. The information processing apparatus according to claim 1, wherein the processor is configured to transmit the reception information to an apparatus that is different from the transmission destination apparatus and other than the information processing apparatus if the reception information is to be deleted from the memory.

3. The information processing apparatus according to claim 2, wherein the processor is configured to:
   inquire the user whether to transmit the reception information to a different apparatus; and
   transmit the reception information to the different apparatus if an instruction to transmit the reception information to the different apparatus is received or not transmit the reception information to the different apparatus if an instruction not to transmit the reception information to the different apparatus is received.

4. The information processing apparatus according to claim 3, wherein the processor is configured to, even after expiration of the validity period, not delete the reception information from the memory if the transmission destination apparatus is still available to the user even after the expiration of the validity period.

5. The information processing apparatus according to claim 4, wherein the processor is configured to, even after the expiration of the validity period, transmit the reception information to the different apparatus if the transmission destination apparatus is still available to the user even after the expiration of the validity period and when an instruction to transmit the reception information to the different apparatus is received from the user.

6. The information processing apparatus according to claim 2, wherein the processor is configured to, even after expiration of the validity period, not delete the reception information from the memory if the transmission destination apparatus is still available to the user even after the expiration of the validity period.

7. The information processing apparatus according to claim 6, wherein the processor is configured to, even after the expiration of the validity period, transmit the reception information to a different apparatus if the transmission destination apparatus is still available to the user even after the expiration of the validity period and when an instruction to transmit the reception information to the different apparatus is received from the user.

8. The information processing apparatus according to claim 1, wherein the processor is configured to, even after expiration of the validity period, not delete the reception information from the memory if the transmission destination apparatus is still available to the user even after the expiration of the validity period.

9. The information processing apparatus according to claim 8, wherein the processor is configured to, even after the expiration of the validity period, transmit the reception information to a different apparatus if the transmission destination apparatus is still available to the user even after the expiration of the validity period and when an instruction to transmit the reception information to the different apparatus is received from the user.

10. The information processing apparatus according to claim 1, wherein the validity period is a time period throughout which an entry of the user into space where the transmission destination apparatus is installed is authenticated.

11. The information processing apparatus according to claim 1, wherein the reception information is a print job.

12. An information processing system comprising:
    the information processing apparatus according to claim 1; and
    a transmission destination apparatus that operates in accordance with the reception information received from the information processing apparatus.

13. A non-transitory computer readable medium storing a program causing a computer to execute a process, the process comprising:
    receiving reception information from a user and authentication information including a validity period which is determined on a per user basis and throughout which a transmission destination apparatus of the reception information is available;
    storing the reception information on the memory; and
    deleting the reception information from the memory upon determining that (i) the validity period expires and (ii) the transmission destination apparatus is not available to the user after expiry of the validity period,
    wherein the process further comprises storing the reception information on a second memory different from and having a higher security level than the memory if the reception information is deleted from the memory.

14. An information processing method comprising:
    receiving reception information from a user and authentication information including a validity period which is determined on a per user basis and throughout which a transmission destination apparatus of the reception information is available;
    storing the reception information on the memory; and deleting the reception information from the memory upon determining that (i) the validity period expires and (ii) the transmission destination apparatus is not available to the user after expiry of the validity period,
wherein the method further comprises storing the reception information on a second memory different from and having a higher security level than the memory if the reception information is deleted from the memory.

\* \* \* \* \*